United States Patent [19]

Spaude

[11] Patent Number: 4,827,213
[45] Date of Patent: May 2, 1989

[54] APPARATUS FOR THE CONTACTLESS DETERMINATION OF VARIABLE INTERVALS OF DISTANCE BY PULSATORY SPARK DISCHARGES

[75] Inventor: Heinz W. Spaude, Aichtal, Fed. Rep. of Germany

[73] Assignee: Daimler-Benz Aktiengesellschaft, Fed. Rep. of Germany

[21] Appl. No.: 164,343

[22] Filed: Mar. 4, 1988

[30] Foreign Application Priority Data

Mar. 18, 1987 [DE] Fed. Rep. of Germany ....... 3708771

[51] Int. Cl.⁴ .......................... G01R 31/02; B23K 9/12
[52] U.S. Cl. ................................ 324/158 R; 324/122; 219/124.34; 219/69.16
[58] Field of Search .................... 219/124.34, 69 G; 324/158 R, 32, 122, 158 F, 158 P; 364/513; 33/503, 504, 505, 533

[56] References Cited

U.S. PATENT DOCUMENTS

| | | | |
|---|---|---|---|
| 4,249,062 | 2/1987 | Hozumi et al. | 219/124.34 X |
| 4,531,192 | 7/1985 | Cook | 364/513 X |
| 4,608,478 | 8/1986 | Shimizu | 219/69 G X |

FOREIGN PATENT DOCUMENTS

3513799 4/1986 Fed. Rep. of Germany.
2173908 10/1986 United Kingdom.

Primary Examiner—Reinhard J. Eisenzopf
Assistant Examiner—Vinh P. Nguyen
Attorney, Agent, or Firm—Barnes & Thornburg

[57] ABSTRACT

An apparatus including at least two electrodes determining two intervals of distance of a body relative to movable objects and activated by a respective high voltage pulse generator, wherein the spark discharges occur either along measurement spark paths or reference spark paths between the electrodes and the object. A sensor in the circuit of the reference spark paths detects a spark discharge occurring along the reference spark paths and generates an impulse which is processed in an evaluation unit to form an adjustment signal as a function of the interval of distance, to adjust the body connectable to the apparatus relative to the object to correct the corresponding interval of distance. Either only one reference electrode is associated with both the high voltage electrodes, or the high voltage electrodes alternately assume the function of the reference electrode, in order to form the reference spark paths.

9 Claims, 3 Drawing Sheets

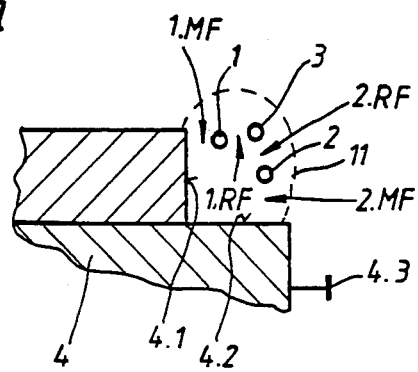
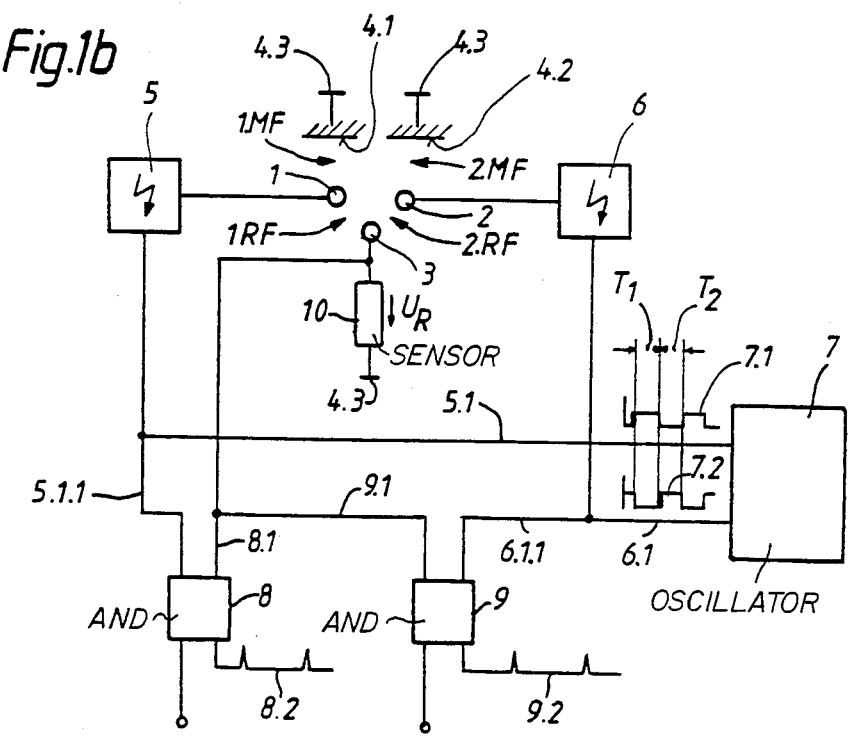

APPARATUS FOR THE CONTACTLESS DETERMINATION OF VARIABLE INTERVALS OF DISTANCE BY PULSATORY SPARK DISCHARGES

BACKGROUND AND SUMMARY OF THE INVENTION

The invention relates to an apparatus for determination of a contact interval between a body contour and a movable object by spark discharge and more specifically to measuring plural intervals between plural contours of the body.

An apparatus of this type exhibiting a measurement and reference spark path is shown in German Patent Specification No. 3,513,799, especially in FIG. 2b thereof. An interval of distance to be maintained between a high voltage electrode directly connected to a body, a tool shank for example, and an object is determined and a follow-up or adjustment signal can be formed as a function of the interval for the purpose of a possible adjustment in the case of an interval deviation. If it were desired to monitor a plurality of intervals to be maintained between the body and the object, then by applying this principle, a plurality of such apparatus could be arranged juxtaposed. When monitoring two intervals, of distance for example, this arrangement would result in two electrode arrangements each comprising a measurement spark path and reference spark path provided in the measurement region. However, such arrangements would lead to considerable structure difficulties in view of the necessarily small dimensions of the electrode arrangements in the measurement regions and the likewise necessary physical proximity of the measurement spark path and the reference spark path.

Therefore, it is an object of the present invention to construct an apparatus of the type described above, so that a determination of at least two intervals of distance is possible therewith, without an appreciable increase in the overall volume.

This and other objects of the invention are attained by providing a unique electrode arrangement which allows measurement of a plurality of intervals of distance. A first and second high voltage electrode connected to a respective first and second pulse generator defines with a grounded object electrode a first and second measurement spark path, respectively, or with a grounded reference electrode, a first or second reference spark path, respectively for monitoring a first and second intervals of distance respectively. The grounded reference electrode may be a third electrode, or the first or second high voltage electrode may respectively serve as the reference electrode for the other high voltage electrode. A modulator alternately modulates the first and second pulse generators. A sensor is provided in circuit with the first and second reference spark paths for generating a modulation identifiable impulse when a spark discharge occurs along one of the first or second reference spark paths. An evaluation unit connected to the sensor determines from the impulses received from the sensors, which reference spark path in which a spark discharge occurred and generates an adjustment signal for the first or second interval. The modulation may be by amplitude pulse duration, polarity or time. The modulator may be, for example, an oscillator for driving the pulse generators which may include a transformer. When the high voltage electrodes act as reference electrodes for the other high voltage electrode, a switching circuit including a plurality of diodes is provided to effectuate this operation. To determine the symmetry or orthogonal of the system, a third electrode is provided having an equal distance with the first contour as the first high voltage electrode. A current source senses the current through the third electrode from the first pulse generator and the evaluation unit provides an appropriate third adjustment signal in response thereto.

Other objects, advantages and novel features of the present invention will become apparent from the following detailed description of the invention when considered in conjunction with the accompanying drawings.

BRIEF DESCRIPTION OF THE DRAWINGS

FIG. 1a is a diagrammatic view of a first exemplary embodiment of the electrode arrangement of the invention using a common reference electrode.

FIG. 1b is the associated electrical schematic diagram.

DETAILED DESCRIPTION OF THE DRAWINGS

Figure 2A:
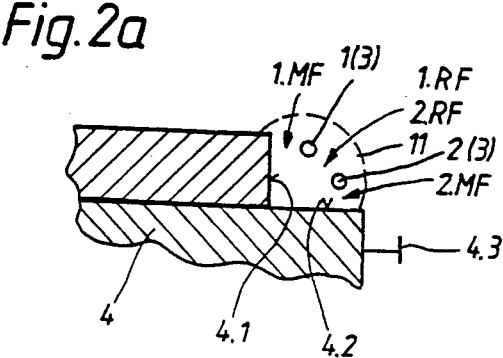
FIG. 2a is a diagrammatic view of a second exemplary embodiment of the electrode arrangement of the invention using the electrodes as mutual reference.

As shown in FIGS. 1a and 1b, an interval from a contour 4.1 of an object 4 is monitored by a high voltage electrode 1, and an interval from a contour 4.2 of the object 4 by a high voltage electrode 2. A reference electrode 3 is arranged between the two high voltage electrodes 1, 2 so that the interval of distance between the two high voltage electrodes 1, 2 is greater than the intervals of distance of the reference electrode 3 from the two high voltage electrodes 1, 2, and also, all the electrodes are located within the gas space 11 which develops in the case of a spark discharge along one of the spark paths. In this case a first measurement spark path 1.MP is formed between the first high voltage electrode 1 and the contour 4.1 of the object 4 grounded at 4.3 and a first reference spark path 1.RF is formed between the first high voltage electrode 1 and the first reference electrode 3. A second measurement spark path 2.MF is formed between the second high voltage electrode 2 and the contour 4.2 and a second reference spark path 2.RF is formed between the second high voltage electrode 2 and the reference electrode 3.

The first high voltage electrode 1 is connected to a first high voltage pulse generator 5 and the second high voltage electrode 2 to a second high voltage pulse generator 6. The high voltage pulse generator 5 is connected through connection 5.1, and the high voltage pulse generator 6 through a connection 6.1, to a modulator 7. The pulse generators 5, 6 may be transformers receiving modulation pulses from an oscillator as the modulator 7. The oscillator can modulate the pulse signal generators 5, 6 with respect to amplitude, pulse duration, polarity and time. The oscillator 7 is also connected through branch lines 5.1.1 and 6.1.1 to a respective demodulator having an AND-gate 8 and 9, which are again connected by a connection 8.1 and 9.1 to a sensor 10, for example a resistor.

The high voltage electrodes 1, 2 are activated alternately by the oscillator 7 through the high voltage pulse signals 5, 6 by corresponding positive pulses of the voltage signals 7.1 and 7.2 generated by the oscillator 7. The positive pulse are staggered in time by the pulse phase T. Thus, a spark discharge will be emitted first from the first high voltage electrode 1 and then from the second high voltage electrode 2. If a spark discharge occurs from the first high voltage electrode 1 along the first reference spark path 1.RF and from the second high voltage electrode 2 along the second reference spark path 2.RF, the sensor 10 will generate an impulse 5. This means that both the interval between the first high voltage electrode 1 and the contour 4.1, and also the interval between the second high voltage electrode 2 and the contour 4.2, are too great. Therefore, adjustment devices must be activated so that the intervals of distance are reduced, until the spark discharge occurs from the first high voltage electrode 1 along the first measurement spark gap 1.MF, and from the second high voltage electrode 2 along the second measurement spark gap 2.MF and sensor 10 will not generate impulses.

However, the abrupt transfer of the spark discharge from the reference to the measurement path means and, thus, the sensor 10 no longer generates an impulse, results in the adjustment of the adjustment devices so that the intervals increase again until the spark discharge again occurs along the corresponding reference spark gap 1.RF and/or 2RF and the process is repeated.

The AND-gates of the demodulators 8, 9 serve to detect whether the impulse generated by the sensor 10 originates from a spark discharge along the first or along the second reference spark path. Because both the voltage signal 7.1 or 7.2 and the impulse of the sensor 10 are fed to each AND-gate, it can be determined by the AND-function, whether the impulse of the sensor 10 occurs within the pulse phase $T_1$ of the voltage signal 7.1 for the first high voltage electrode 1 or within the pulse phase $T_2$ of the voltage signal 7.2 for the second high voltage electrode 2. Adjustment signals 8.2, 9.2 (0 signal or 1 signal) accordingly then appear at the respective output of the demodulator, which activates the associated adjustment device of the body, for example the welding arm of a welding set, or a robot hand, which is connected to the apparatus, to adjust the interval of distance to the object 4.

Figure 2B:
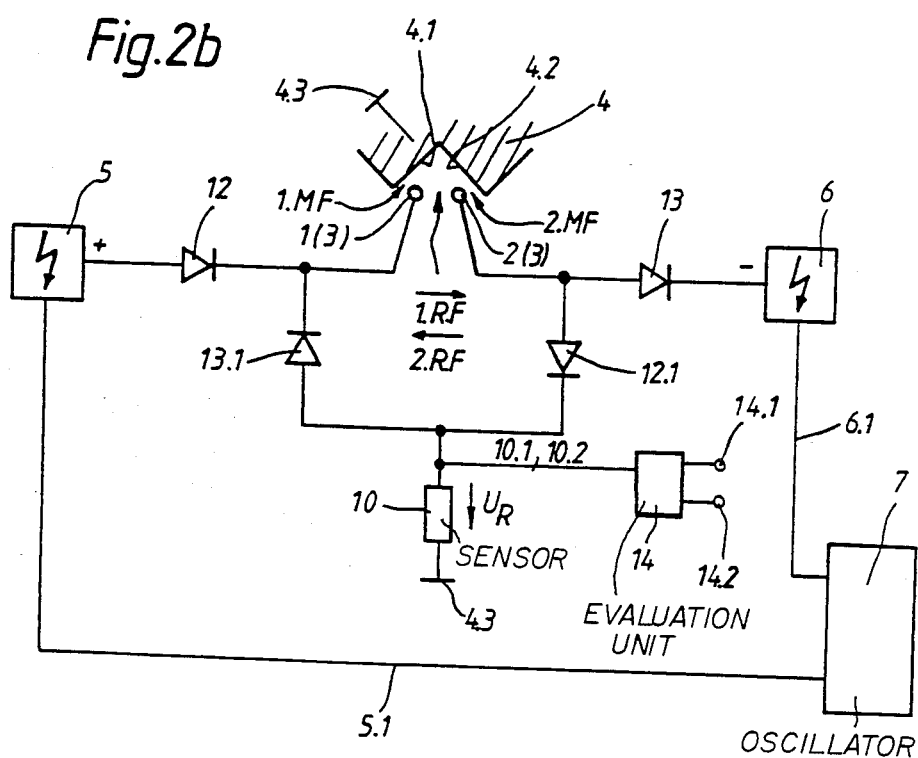
FIG. 2b is the associated electrical schematic diagram.

If a particularly high contour resolution is required of the apparatus, then the reference spark paths must be correspondingly small, and also the high voltage electrodes must be located relatively close together. In order to satisfy these conditions, as shown in FIGS. 2a and 2b, only two high voltage electrodes 1, 2 are used. In this case, a first measurement spark path 1.MF is formed between the first high voltage electrode 1 and the contour 4.1 and a second measurement spark path 2.MF between the second high voltage electrode 2 and the contour 4.2. Furthermore, the reference spark paths are formed between the two high voltage electrodes 1, 2. Specifically, a first reference path 1.RF is formed between the first high voltage electrode 1 and the second high voltage electrode 2, which then serves as reference electrode 3, and a second reference spark path 2.RF is formed between the second high voltage electrode 2 and the first high voltage electrode 1, which then serves as reference electrode 3.

In order that a spark discharge can develop along the reference spark paths as freely as along the measurement spark paths, the two paths must exhibit comparable impedances However, the secondary windings of the high voltage pulse generator 5, 6 through which the discharge of current would discharge to ground, constitute substantial impedances. For example, a spark discharge along the first reference spark path 1.RF would be through the grounded secondary winding of the high voltage pulse generator 6 and vice versa for the second reference spark path 2.RF. These impedances are therefore short-circuited by two high voltage diodes 12.1, 13.1 connected in series with the sensor 10 between a respective high voltage electrode 1, 2 and ground 4.3. However, because even these high voltage diodes are ultimately not neutral during a spark discharge, but constitute small impedances, their influence is simulated and therefore compensated by two further high voltage diodes 12, 13 with the same electrical characteristics.

The high voltage diode 12 is connected between the first high voltage electrode 1 and its high voltage pulse generator 5, and the high voltage diode 13 is connected between the second high voltage electrode 2 and its high voltage pulse generator 6. The current of the first reference spark path 1.RF is from the positive high voltage pulse generator 5 to sensor 10 through diode 12, electrodes 1 and 2 and diode 12.1. The current of the second reference spark path 2.RF is from sensor 10 to the negative high voltage pulse generator 6 though diode 13.1, electrode 2 and 1 and diode 13.

Again in this exemplary embodiment, the high voltage electrodes 1, 2 are activated alternately by the oscillator 7 through the high voltage pulse generates 5, 6. Now when a spark discharge occurs from the first high voltage electrode 1 along the first reference spark path 1.RF, the second high voltage electrode 2 serves as a reference electrode 3, while the discharge current flows through the diode 12.1 and the resistance of the sensor 10 to ground 4.3. Conversely, if a spark discharge then occurs from the second high voltage electrode 2 along the second reference spark path 2.RF, the first high voltage electrode 1 serves as reference electrode 3 and the current flow through the diode 13.1 and the resistance of the sensor 10 to ground 4.3.

However, spark discharges along the reference spark paths signify that the intervals of distance between the high voltage electrodes 1.2 and the contours 4.1, 4.2 are too great, therefore adjustment devices must be activated so that the intervals decrease. The signals for this purpose are supplied by the sensor 10, because due to the different polarity of the high voltage sources, positive impulses 10.1 and/or negative impulses 10.2 appear at its output, which are resolved in the evaluation unit 14 into corresponding adjustment signals 14.1, 14.2 for the corresponding adjustment devices. A positive impulse or a negative impulse is no longer generated by the sensor 10 only when the high voltage electrode 1 or the high voltage electrode 2 has approached the object so far that the spark discharge now occurs along the first measurement spark path 1.MF or the second measurement spark path 2.MF. This means that the follow-up devices are inversely adjusted again and the process is repeated. The evaluation unit 14 could include polarity detectors connected to a respective output.

Figure 3A:
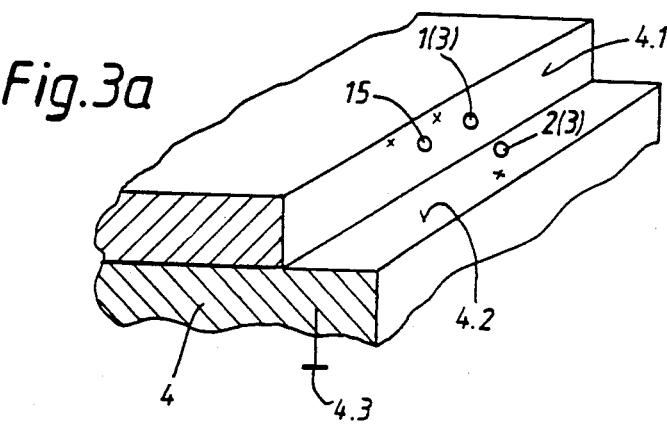
FIG. 3a is a diagrammatic view of a third exemplary embodiment of the electrode arrangement of the invention using the electrodes as mutual reference.
Figure 3B:
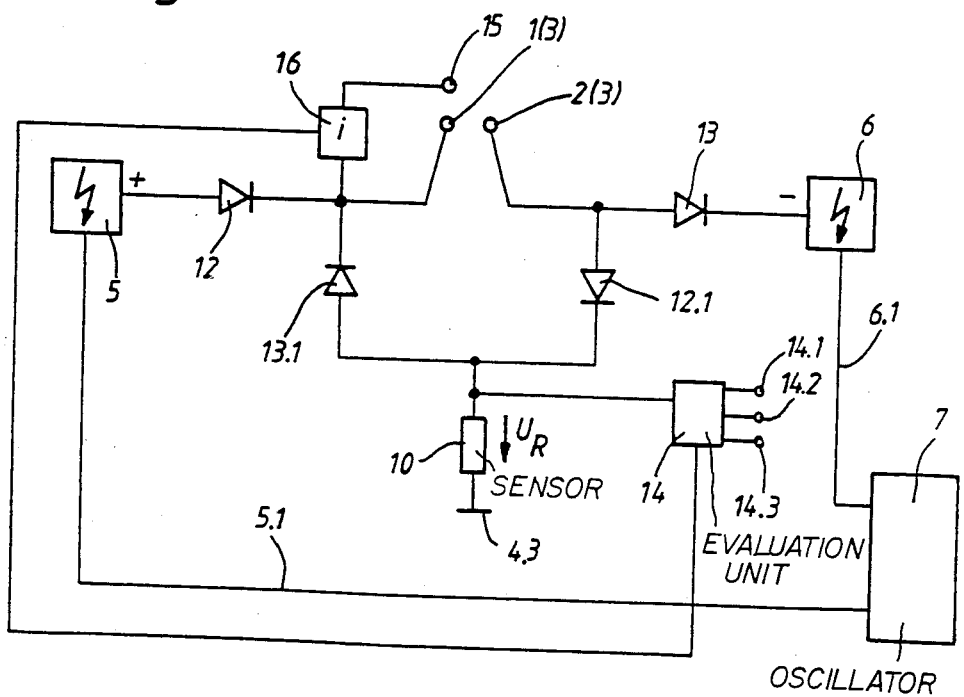
FIG. 3b is the associated electrical schematic diagram.

FIGS. 3a and 3b show an arrangement corresponding to FIGS. 2a and 2b, but including an additional high voltage electrode 15. The high voltage electrode 15 is associated with the contour 4.1 of the object 4 with equal interval of distance analogously to the high voltage electrode 1. The high voltage electrode 15 is connected electrically to the high voltage electrode 1 through a current sensor 16, so that it is likewise supplied by the high voltage pulse generator 5. The high voltage electrode 15 serves in conjunction with the high voltage electrode 1, to symmetrize the interval of distance of the two high voltage electrodes 1, 15 to the contour 4.1, for example, and thus to permit the electrode arrangement to be aligned perpendicular to the object, for example.

In the case of a spark discharge occurring from the high voltage electrode 15 to the ground electrode represented by the object, an impulse is generated by the current sensor 16, which is likewise fed to the evaluation unit 14 and is resolved there into an adjustment signal 14.3 corresponding to the associated adjustment device. The functions allotted to the individual electrodes in this case are as follows:

(a) the distance between high voltage electrode 2 and object 4.2 compared to the distance between high voltage electrode 2 and high voltage electrode 1 is a measurement of the downward interval to contour 4.2;

(b) the distance between the high voltage electrode 1 and object 4.1 compared to the distance between high voltage electrode 1 and high voltage electrode 2 is a measurement of the lateral interval to contour 4.1; and (c) the distance between the high voltage electrode 1 and object 4.1 compared to the distance between high voltage electrode 15 to object 4.1 is a measurement of symmetry.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An apparatus for the contactless determination of at least first and second intervals of distance between a body and at least a first and second contour of an object movable relative to the body comprising:
   a first high voltage pulse generator;
   a first high voltage electrode connected to said first pulse generator and defining with a grounded object electrode representing said object a first measurement spark path and with a grounded reference electrode a first reference spark path for said first interval of distance;
   a second high voltage pulse generator;
   a second high voltage electrode connected to said second pulse generator and defining with said grounded object electrode a second measurement spark path and with said reference electrode a second reference spark path for said second interval of distance;
   modulation means for alternately modulating said first and second pulse generators;
   sensor means, connected with said first and second reference spark paths, for generating a modulation identifiable impulse when a spark discharge occurs along one of said first and second reference spark paths; and
   evaluation means connected to said sensor means for determining from said impulse which reference spark path a spark discharge occurred and generating an adjustment signal for said first and second intervals.

2. An apparatus according to claim 1, wherein said spark paths are in a common gas space.

3. An apparatus according to claim 1, wherein said modulation means includes an oscillator and said first and second pulse generator generate high voltage pulses from input signals from said oscillator.

4. An apparatus according to claim 1, wherein said modulation means modulates said pulse generators with respect to one of the following types of modulation: amplitude; pulse duration; polarity or time, and said evaluation means determines which reference path a spark discharge occurred as a function of the type of modulation.

5. An apparatus according to claim 1, including switching means connecting said first and second high voltage electrodes to said first and second pulse generators and said sensor means for selectively connecting said second high voltage electrode as said grounded reference electrode in said first reference spark path and said first high voltage electrode as said grounded reference electrode in said second reference spark path.

6. An apparatus according to claim 5, wherein said first and second pulse generators produce pulses of opposite polarity; and said switching means includes first and second diodes connected between said first and second pulse generators and said first and second high voltage electrodes respectively for permitting current flow therebetween, and third and fourth diodes connected between said sensor means and said first and second high voltage electrodes respectively for permitting current flow therebetween when said high voltage electrode is a reference electrode.

7. An apparatus according to claim 1, wherein said modulation means modulates said first and second pulse generators staggered in time by first and second modulation signal and said evaluation means includes first and second AND-gates receiving first and second modulation signals respectively and both receiving said impulse and providing a respective adjustment signal.

8. An apparatus according to claim 1, wherein the length of the reference spark paths is equal to or shorter than the interval of distance between the two high voltage electrodes.

9. An apparatus according to claim 1, including:
   a third high voltage electrode connected to said first pulse generator through a current sensor to said first pulse generator and defining with said object electrode a third measurement spark path with said first contour;
   said current sensor generating a third impulse when a spark occurs along said third measured spark path; and
   said evaluation means receiving said third impulse and generating a third adjustment signal in response thereto.

* * * * *